(12) United States Patent
Min

(10) Patent No.: US 8,240,866 B2
(45) Date of Patent: *Aug. 14, 2012

(54) SUPPORTER OF DIFFUSER PLATE IN BACKLIGHT UNIT

(75) Inventor: Bong Kul Min, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/275,709

(22) Filed: Oct. 18, 2011

(65) Prior Publication Data

US 2012/0033436 A1   Feb. 9, 2012

Related U.S. Application Data

(63) Continuation of application No. 12/881,780, filed on Sep. 14, 2010, now Pat. No. 8,061,863.

(30) Foreign Application Priority Data

Dec. 22, 2009   (KR) .................. 10-2009-0129240

(51) Int. Cl.
*F21V 33/00* (2006.01)
(52) U.S. Cl. ....... 362/97.4; 362/97.1; 362/225; 362/306
(58) Field of Classification Search .............. None
See application file for complete search history.

(56) References Cited

U.S. PATENT DOCUMENTS

| | | | | |
|---|---|---|---|---|
| 6,902,300 | B2 * | 6/2005 | Lee | 362/306 |
| 6,974,221 | B2 * | 12/2005 | Wu et al. | 362/29 |
| 7,156,549 | B2 * | 1/2007 | Hsieh | 362/633 |
| 7,600,889 | B2 * | 10/2009 | Fukuda | 362/225 |
| 2002/0044437 | A1 | 4/2002 | Lee | |
| 2006/0158904 | A1 | 7/2006 | Kuo et al. | |
| 2007/0019419 | A1 * | 1/2007 | Hafuka et al. | 362/373 |
| 2008/0007947 | A1 * | 1/2008 | Yokota et al. | 362/225 |
| 2008/0111937 | A1 | 5/2008 | Chen | |
| 2008/0303978 | A1 * | 12/2008 | Han et al. | 349/64 |

FOREIGN PATENT DOCUMENTS

| | | |
|---|---|---|
| EP | 1519219 A2 | 3/2005 |
| JP | 2007-157450 | 6/2007 |
| KR | 10-2005-0076813 A | 7/2005 |
| KR | 10-2005-0116641 A | 12/2005 |
| KR | 10-2005-0116642 A | 12/2005 |
| KR | 10-2007-0063665 A | 6/2007 |
| KR | 10-2008-00113901 A | 12/2008 |

* cited by examiner

*Primary Examiner* — Laura Tso
(74) *Attorney, Agent, or Firm* — McKenna Long & Aldridge LLP

(57) ABSTRACT

Disclosed is a supporter of a diffuser plate for a backlight unit. The supporter functions to support a diffuser plate and includes: a frame located in a lower portion thereof; a supporting member of which a portion penetrates the frame; and a cap damper of which a portion penetrates the inside of the supporting member.

18 Claims, 8 Drawing Sheets

RELATED ART

SUPPORTER OF DIFFUSER PLATE IN BACKLIGHT UNIT

This application is a continuation of prior U.S. patent application Ser. No. 12/881,780 filed Sep. 14, 2010, now U.S. Pat. No. 8,061,863 which claims priority to Korean Patent Application No. 10-2009-0129240, filed Dec. 22, 2009, each of which is incorporated by reference in its entirety as if fully set forth herein.

BACKGROUND OF THE INVENTION

1. Field of the Invention

The present invention relates to a supporter of a diffuser plate in a backlight unit, which is capable of maintain a predetermined interval between a light source and the diffuser plate.

2. Description of the Related Art

A liquid crystal display is a light receiving device which controls the amount of light incident from the outside and displays images. The liquid crystal display requires a separate backlight unit for irradiating light to the LCD panel of the liquid crystal display.

The type of the backlight unit is largely divided into an edge type and a direct type in accordance with the position of a light source to a display surface. Since the direct type backlight unit has a high utilization of light, is easy to handle and has no limit to the size of the display surface, the direct type backlight unit is being generally used for a large-scaled liquid crystal display having a size larger than 30 inches.

The direct type backlight unit does not require a light guide plate converting line light into surface light of a lamp. The direct type backlight unit includes a plurality of light sources, a reflective sheet and a diffuser plate. A plurality of the light sources are included in the lower part of the display surface. The reflective sheet reflects light irradiated from the light source to the display surface and prevents optical loss. The diffuser plate scatters light to the upper part of the light source and emits uniform light.

Here, since there exists a predetermined space between the light source and the diffuser plate, the diffuser plate sinks due to a self weight or a high temperature. In order to prevent the diffuser plate from sinking between the diffuser plate and the reflect sheet, a plurality of supporters are provided.

FIG. 1 is a partial cross sectional view of a supporting structure of a diffuser plate of a conventional direct type backlight unit.

Referring to FIG. 1, a supporter 6 is provided between a reflective sheet 4 and a diffuser plate 5. A prism sheet 8 is provided on the top surface of the diffuser plate 5. The prism sheet 8 collects the light diffused by the diffuser plate 5 and improves the luminance of an LCD panel 9 above the prism sheet 8. The LCD panel 9 displaying images is positioned above the prism sheet 8. Though not shown, a plurality of light sources are provided between the reflective sheet 4 and the diffuser plate 5 and between the supporters 6.

The supporter 6 is made of a solid material such as polycarbonate and the like so as to sufficiently prevent the diffuser plate 5 from sinking. An end of the supporter 6 contacting with the diffuser plate 5 is formed pointed such that the supporter's area viewed from the display surface is as small as possible.

However, since the end of the supporter 6 is pointed, the contact area with the diffuser plate 5 may be scratched. If a severe external impact is given to the supporting structure, the end of the supporter 6 is broken or transformed.

In order to solve the problem, FIG. 2 shows an end of the supporter contacting with the diffuser plate is made of a ductile material.

Referring to FIG. 2, a conventional supporter 10 includes a supporting member 11 and an elastic contacting member 12 contacting with the diffuser plate. An insertion hole is formed inside the contacting member 12. An end of the supporting member 11 is inserted into the inside of the contacting member 12. The contacting member 12 is made of a ductile material, reducing the possibility that the diffuser plate may be scratched when the contacting member 12 contacts with the diffuser plate.

However, in the supporter 10 having such a structure, the contacting member 12 is coupled to one end of the supporting member 11 by means of an interference fit. As a result, as shown in FIG. 3, there is a problem in that the contacting member 12 is separated from the supporting member 11 by an external impact or an external force.

When the contacting member 12 is separated from the supporting member 11, the diffuser plate is not satisfactorily supported. If the end of the supporting member 11 directly contacts with the diffuser plate, many scratches may be produced.

SUMMARY OF THE INVENTION

One aspect of this invention is a supporter of a diffuser plate for a backlight unit. The supporter includes: a frame located in a lower portion thereof; a supporting member of which a portion penetrates the frame; and a cap damper of which a portion penetrates the inside of the supporting member.

The supporting member is injected to be fixed to the frame by a locking method. In the specification, the term "fix" generally refers to a more secure form of attachment, such as locking. The supporting member includes a supporting member body positioned on the frame, a supporting member pole formed extending from the supporting member body, and a supporting member hole formed inside the supporting member body and the supporting member pole.

A supporting member cavity is formed in an end of the supporting member hole such that an end of the cap damper is fixed by a locking method.

BRIEF DESCRIPTION OF THE DRAWINGS

The embodiment will be described in detail with reference to the following drawings.

DETAILED DESCRIPTION OF EMBODIMENTS

Hereinafter, an embodiment of the present invention will be described in detail with reference to the accompanying drawings. Items disclosed in the embodiment determine the sprit and scope of the present invention. The spirit of the embodiment includes changes and modification of the embodiment by means of addition, elimination and change of the components of the present invention.

In the following description, a word "including" does not exclude other components or steps different from those mentioned.

Figure 1:
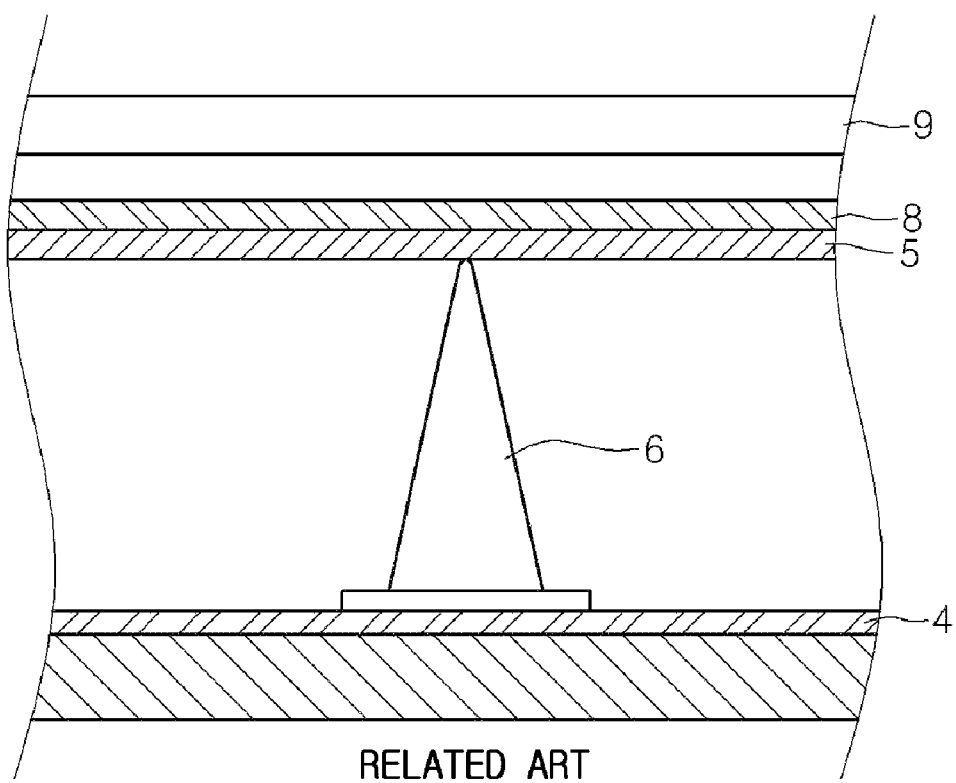
FIG. 1 is a partial cross sectional view of a supporting structure of a diffuser plate of a conventional direct type backlight unit.
Figure 2:
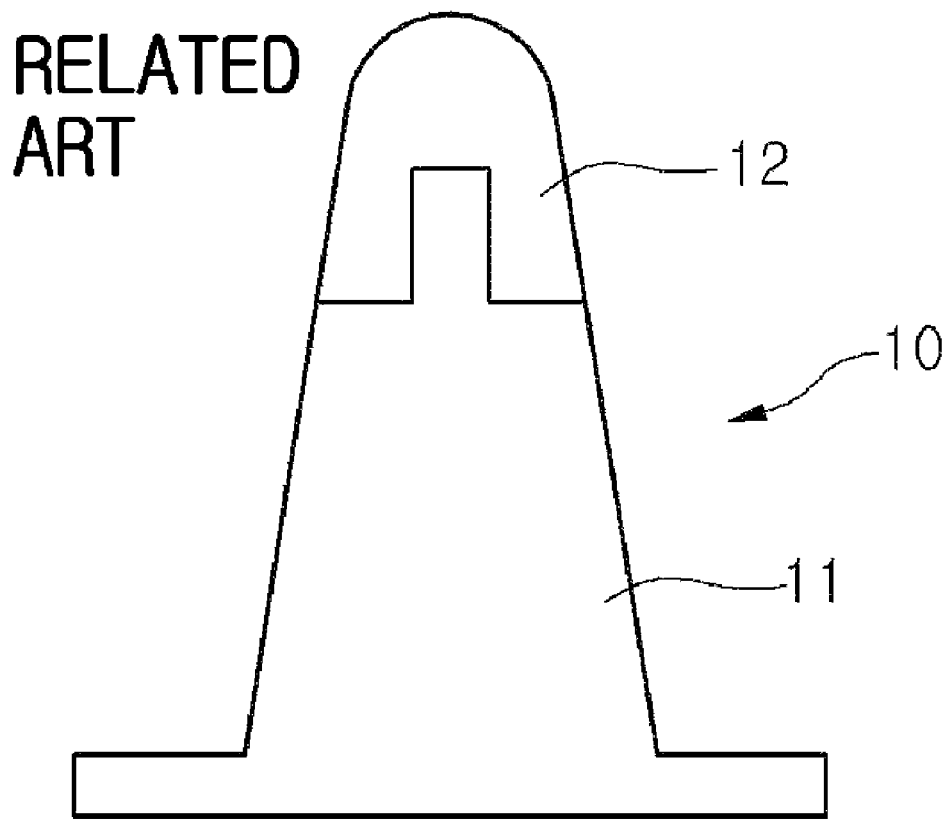
FIG. 2 is a view of a supporting structure of the conventional diffuser plate.
Figure 3:
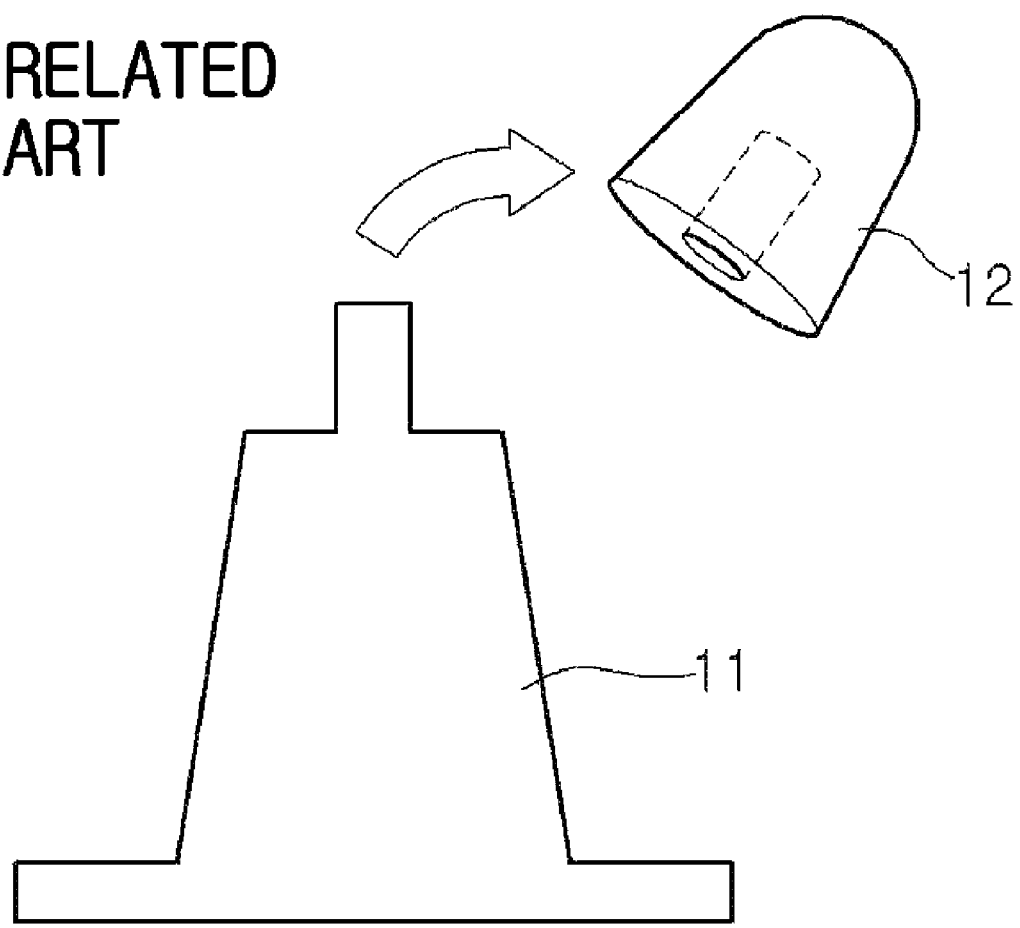
FIG. 3 is a view showing a part of the supporting structure of the conventional diffuser plate is separated therefrom.
Figure 4:
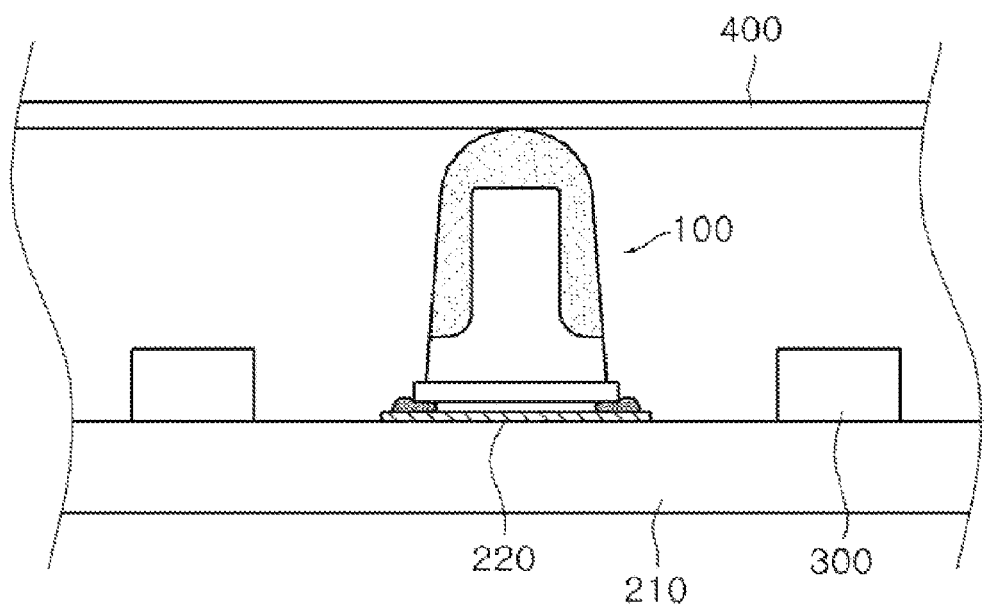
FIG. 4 is a partial cross sectional view of a backlight unit according to an embodiment of the present invention.

FIG. 4 is a partial cross sectional view of a backlight unit according to an embodiment of the present invention.

Referring to FIG. 4, a backlight unit of an embodiment of the present invention includes a light source 300 emitting light, a PCB substrate 210 for driving the light source 300, a diffuser plate supporter 100 for maintaining a predetermined interval between a diffuser plate 400 and the light source 300.

Though not shown, a bottom cover may be positioned under the PCB substrate 210. The bottom cover performs a function of protecting the aforementioned components from the external impact to the backlight unit.

The light source 300 may include, for example, an LED package. A copper foil layer 220 for driving the light source 300 is formed on the PCB substrate 210.

The diffuser plate supporter 100 is disposed on the copper foil layer 220 of the PCB substrate 210. As shown, the bottom surface of the diffuser plate supporter 100 is soldered on the copper foil layer 220, thereby fixing the diffuser plate supporter 100 on the PCB substrate 210. In the embodiment, since the diffuser plate supporter 100 is disposed on the PCB substrate 210 included inside the backlight unit, it is not necessary to provide a separate member or component for mounting the diffuser plate supporter 100

The structure of the diffuser plate supporter 100 will be described in detail with reference to FIG. 5.

Figure 5:
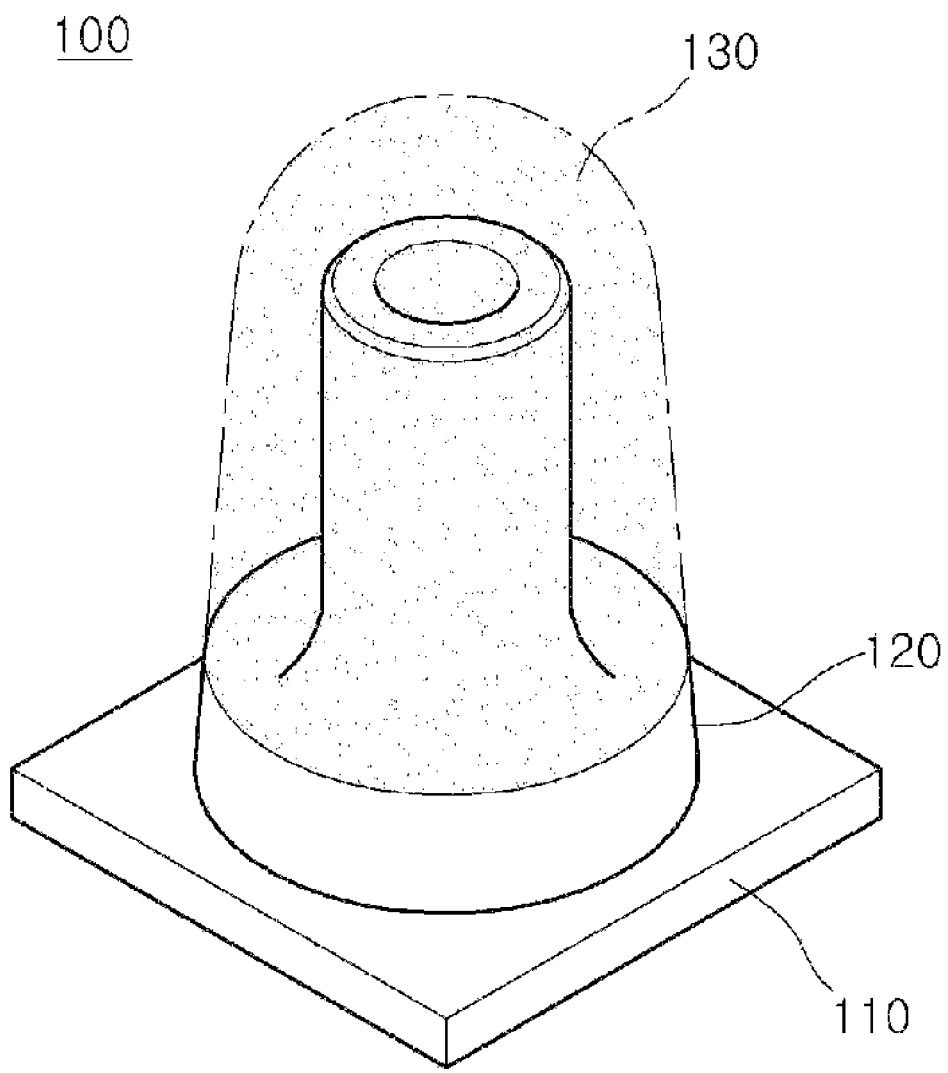
FIG. 5 is a perspective view of a supporter of a diffuser plate according to the embodiment of the present invention.
Figure 6:
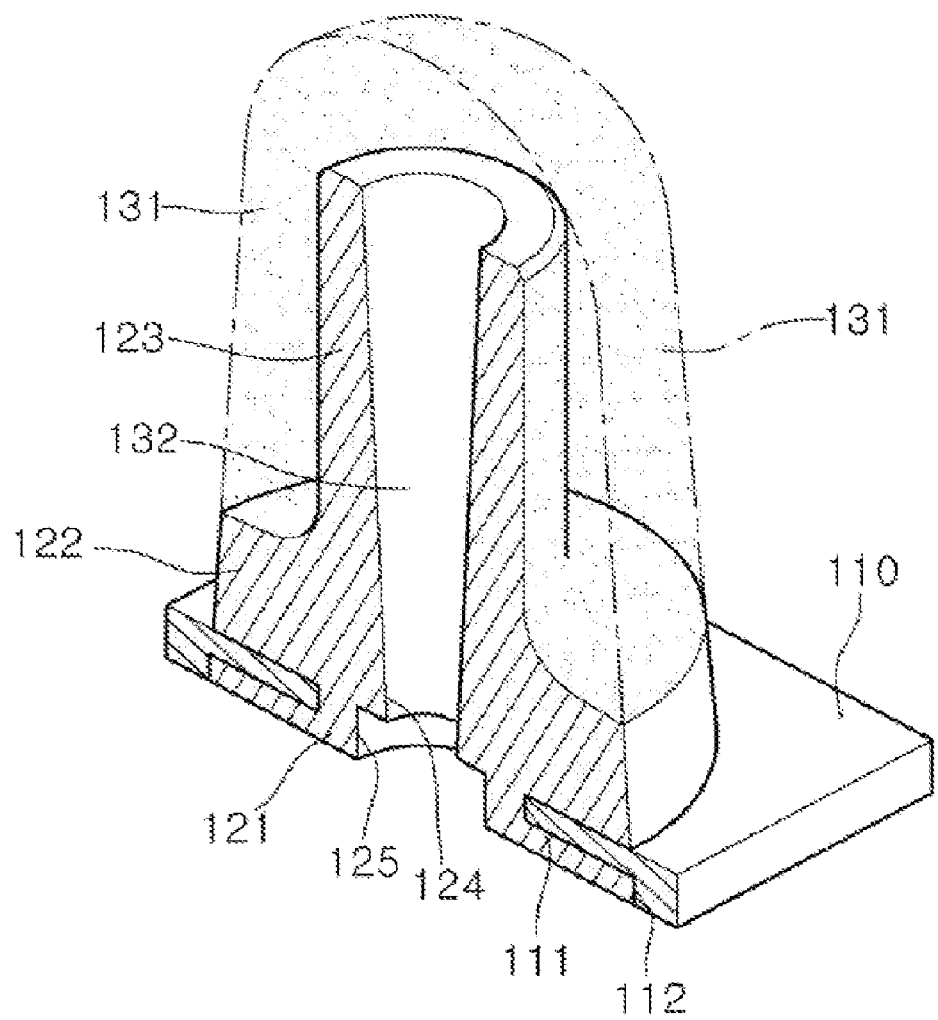
FIG. 6 is a cross sectional view of a supporter of a diffuser plate according to the embodiment of the present invention.

FIG. 5 is a perspective view of a supporter of a diffuser plate according to the embodiment of the present invention. FIG. 6 is a cross sectional view of a supporter of a diffuser plate according to the embodiment of the present invention.

Referring to FIG. 5, the diffuser plate supporter 100 of the embodiment includes a frame 110, a supporting member 120 and a cap damper 130. It will be uderstood that the cap damper is positioned at the forward most portion of the supporter, in the preferred embodiment.

The frame 110 is made of a metallic material. It is preferable that the supporting member 120 and the cap damper 130 are made of a transparent or white material. The supporting member 120 is formed by injection molding a plastic material. A material used for constituting the supporting member 120 is not limited to the plastic material. Another material having sufficient rigidity to support the diffuser plate can be also used. The cap damper 130 is formed by injection molding an elastic material.

The frame 110 is fixed on the copper foil layer of the PCB substrate and fixes the position of the supporting member 120 and the cap damper 130.

The supporting member 120 has sufficient rigidity to prevent the diffuser plate 400 from sinking. The supporting member 120 is coupled to the frame 110 by means of a locking method such that the supporting member 120 is not separated from the frame 110 after performing the injection molding.

The cap damper 130 is formed inside and outside the supporting member 120 by performing the injection molding. The cap damper 130 is made of a silicon material or a rubber material such that the cap damper 130 has elasticity at the time of contacting with the diffuser plate. The cap damper 130 is made of a transparent or white material so as to improve the efficiency of light emitted from the light source. The cap damper 130 is also coupled to a portion of the supporting member 120 by means of a locking method such that the cap damper 130 is not separated from the supporting member 120 by an external force and the like after performing the injection molding.

Figure 8:
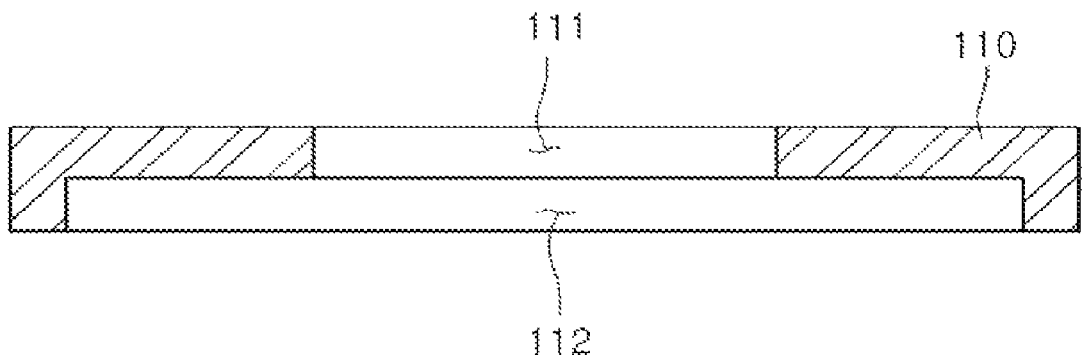
FIG. 8 is a view of a cross-sectional shape of the frame of a supporter of a diffuser plate according to the embodiment of the present invention.

A cross-sectional structure of the diffuser plate supporter 100 will be described with reference to FIGS. 6 and 8. A frame hole 111 through which the supporting member 120 penetrates is formed in the frame 110. A frame cavity 112 having a size greater than that of the frame hole 111 is formed extending from the frame hole 111. That is, the frame cavity 112 is formed to have a size difference between the frame hole 111 and the frame cavity 112.

A portion 121 of the injection-molded supporting member 120 is formed inside the frame cavity 112, so that the supporting member 120 is fixed to the frame 110 by a locking method. Therefore, it is possible to prevent the supporting member 120 from being separated from the frame 110 by an external impact or an external force.

A hole through which a portion of the cap damper 130 penetrates is formed in the supporting member 120. (Here, a hole formed in the supporting member is referred to as a supporting member hole. The supporting member hole is formed inside a supporting member pole and a supporting member body constituting the supporting member.)

That is, a supporting member hole 124 having a first size is formed inside the supporting member 120. A supporting member cavity 125 having a second size greater than that of the supporting member hole 124 is formed to be connected to the supporting member hole 124. In other words, the supporting member has a hole formed extending from the upper part thereof to the lower part thereof. Thus, there is a difference in a diameter between the supporting member hole and the supporting member cavity within the hole.

As shown, the overall cross-sectional shape of the supporting member hole 124 has a counter gradient undercut shape.

While the size of the supporting member hole 124 is mentioned as the first size, the size of the supporting member hole 124 is not necessarily uniform. That is, as shown, the hole size of the supporting member 120 is smaller toward a farther lower part of the supporting member 120. However, the size of the supporting member hole 124 contacting with the supporting member cavity 125 is formed to be smaller than that of the supporting member cavity 125 such that the cap damper 130 formed inside the supporting member cavity 125 is fixed by a locking method.

Since a portion of the supporting member cavity 125 is positioned inside the frame cavity 112, a portion of the supporting member 120 and a portion of the cap damper 130 are formed inside the frame cavity 112.

The supporting member 120 includes a supporting member body 122 positioned on the frame 100 and a supporting member pole 123 formed extending from the supporting member body 122. The supporting member pole 123 is injection-molded such that the outer surface of the supporting member pole 123 reflects light emitted from the light source to the LCD panel. The thickness of the supporting member pole 123 increases more toward the further supporting member body 122 and decreases more toward the further upper part thereof. The supporting member body 122 has a sufficient thickness to support the self weight of the diffuser plate transferred through the supporting member pole 123.

Meanwhile, the cap damper 130 is positioned on the supporting member 120 and includes a damper outer side 131 formed to have a predetermined thickness along the outer surface of the supporting member pole 123 and includes a damper inner side 132 disposed inside the hole formed in the supporting member 120

In particular, the upper part of the damper outer side 131 contacts with the diffuser plate of the backlight unit and, as shown, has a curved shape for reducing the scratches on the diffuser plate. Moreover, as described above, the cap damper 130 is made of an elastic material such as a silicon material and the like for directly absorbing an external impact.

The damper inner side 132 of the cap damper 130 is formed inside the supporting member cavity 125 and the supporting member hole 124 in the supporting member 120. A size difference between the supporting member hole 124 and the supporting member cavity 125 causes the end of the damper inner side 132 to have a curved shape due to a cross-sectional area difference. That is, the end of the damper inner side 132 is fixed by the supporting member cavity 125 through a locking method.

Figure 7:
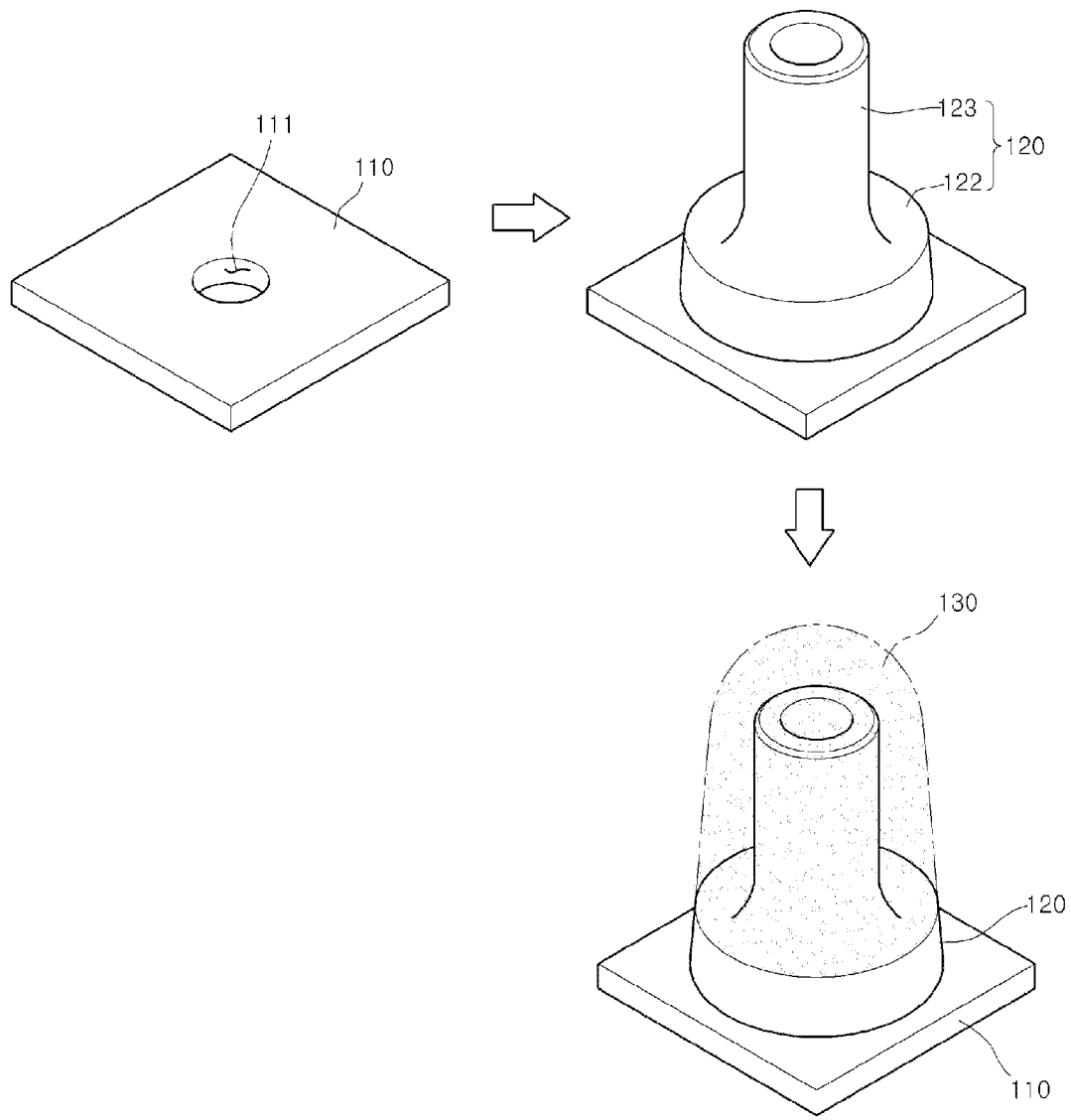
FIG. 7 is a view of a method of manufacturing a supporter of a diffuser plate according to the embodiment of the present invention.

FIG. 7 is a view of a method of manufacturing a supporter of a diffuser plate according to the embodiment of the present invention.

First, a frame 110 is provided which is coupled to a copper foil layer of a PCB substrate in a backlight unit. A frame hole 111 having a predetermined size is formed in the frame 110. A frame cavity having a size greater than that of the frame hole 111 is formed extending from and under the frame hole 111. The frame 110 is made of a metallic material such as aluminum.

Then, a first injection molding process is performed for forming a supporting member 120 coupled to the frame 110. The shape of the supporting member 120 formed by the first injection molding process is the same as that described above. That is, the lower part of the supporting member 120 is positioned in the supporting member cavity of the supporting member 120, so that the supporting member 120 is fixed by the locking method. A supporting member hole is formed inside the supporting member 120 such that a cap damper 130 is inserted.

After the supporting member 120 is formed by the injection molding process, a second injection molding process is performed for forming the cap damper 130 by using a transparent and ductile material. As shown, the diffuser plate supporter according to the embodiment is hereby produced. Here, the shape of the cap damper 130 is the same as that described above. A portion contacting with the diffuser plate has a smoothly curved shape, thereby preventing the diffuser plate from being scratched.

The cap damper 130 is also fixed inside the supporting member 120 by the locking method. Therefore, it is possible to prevent the cap damper 130 from being separated by an external impact or stress.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6)

What is claimed is:

1. A supporter of a diffuser plate for a backlight unit, the supporter comprising:
   a frame located in a lower portion thereof;
   a supporting member of which a portion penetrates the frame; and
   a cap damper of which a portion penetrates the inside of the supporting member.

2. The supporter of a diffuser plate for a backlight unit of claim 1, wherein the supporting member has an opening formed longitudinally there through, and wherein the opening through a first portion of the supporting member located proximate to the frame has a width greater than the width of the opening through a second portion of the supporting member located distal to the frame.

3. The supporter of a diffuser plate for a backlight unit of claim 2, wherein at least a portion of the cap damper penetrates the opening of the supporting member, thereby fixing the cap damper to the supporting member.

4. The supporter of a diffuser plate for a backlight unit of claim 1, wherein the frame comprises a frame hole having a predetermined size and a frame cavity forming a predetermined space having a size larger than the size of the frame.

5. The supporter of a diffuser plate for a backlight unit of claim 4, wherein one side end of the supporting member penetrates the frame hole and is located within the frame cavity.

6. The supporter of a diffuser plate for a backlight unit of claim 1, wherein the frame is formed of a metallic material and is coupled to a copper foil layer of a PCB substrate for operating a light source in the backlight unit.

7. The supporter of a diffuser plate for a backlight unit of claim 1, wherein the supporting member is formed by a transparent or white plastic injection molding.

8. The supporter of a diffuser plate for a backlight unit of claim 1, wherein the supporting member is injected in such a manner as to be fixed to the frame in a locking manner, and the supporting member comprises a supporting member body located on the frame, a supporting member pole formed extending from the supporting member body and a supporting member hole formed within the supporting member body and the supporting member pole.

9. The supporter of a diffuser plate for a backlight unit of claim 8, wherein a supporting member cavity causing one end of the cap damper to be fixed in a locking manner is formed on one end of the supporting member hole.

10. The supporter of a diffuser plate for a backlight unit of claim 9, wherein the supporting member cavity is located within the frame cavity.

11. The supporter of a diffuser plate for a backlight unit of claim 8, wherein a cross sectional shape of the supporting member hole is formed in a counter gradient direction of an undercut shape.

12. The supporter of a diffuser plate for a backlight unit of claim 8, wherein the cap damper comprises a damper inner side formed within the supporting member hole and a damper outer side formed on the supporting member body, and wherein the upper part of the damper outer side is molded in a curved shape.

13. The supporter of a diffuser plate for a backlight unit of claim 1, wherein the cap damper is formed of a silicon material or a rubber material.

14. A supporter of a diffuser plate for a backlight unit, the supporter comprising:
   a frame located in a lower portion thereof;
   a supporting member of which a portion penetrates the frame; and a cap damper formed over the supporting member, wherein the frame has a frame opening therethrough, and a portion of the supporting member extends to the frame opening, wherein the frame opening has a first portion and a second portion, wherein the first portion of the frame opening is positioned at the base of the supporter, and wherein the width of the first portion of the frame opening is greater than the width of the second portion of the frame opening.

15. The supporter of a diffuser plate for a backlight unit of claim 14, wherein the supporting member has an opening formed longitudinally there through, and wherein at least a portion of the cap damper penetrates the opening of the supporting member, so that the cap damper is fixed.

16. The supporter of a diffuser plate for a backlight unit of claim 15, wherein the portion of the cap damper that is formed through the supporting member opening has a width that corresponds to the width of the opening of the supporting member.

17. The supporter of a diffuser plate for a backlight unit of claim 15, wherein the cap damper is injection molded over an outer surface of the supporting member and through the supporting member opening.

18. The supporter of a diffuser plate for a backlight unit of claim 14, wherein the supporting member is injection molded through the frame opening.

* * * * *